US012647848B2

(12) United States Patent
He et al.

(10) Patent No.: US 12,647,848 B2
(45) Date of Patent: Jun. 2, 2026

(54) CELL RESELECTION METHOD, TERMINAL, AND NON-TRANSITORY READABLE STORAGE MEDIUM

(71) Applicant: VIVO MOBILE COMMUNICATION CO., LTD., Dongguan (CN)

(72) Inventors: Ranran He, Dongguan (CN); Yanxia Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 205 days.

(21) Appl. No.: 18/372,465

(22) Filed: Sep. 25, 2023

(65) Prior Publication Data

US 2024/0015611 A1     Jan. 11, 2024

Related U.S. Application Data

(63) Continuation of application No. PCT/CN2022/081455, filed on Mar. 17, 2022.

(30) Foreign Application Priority Data

Mar. 23, 2021    (CN) .......................... 202110310837.6

(51) Int. Cl.
| | |
|---|---|
| *H04W 36/00* | (2009.01) |
| *H04W 36/08* | (2009.01) |
| *H04W 36/36* | (2009.01) |

(52) U.S. Cl.
CPC ....... *H04W 36/0061* (2013.01); *H04W 36/08* (2013.01); *H04W 36/36* (2013.01)

(58) Field of Classification Search
CPC .. H04W 36/0061; H04W 36/08; H04W 36/36
See application file for complete search history.

(56) References Cited

U.S. PATENT DOCUMENTS

| | | | | |
|---|---|---|---|---|
| 2005/0141443 | A1* | 6/2005 | Kim | ........................ H04B 7/022 |
| 2015/0351151 | A1* | 12/2015 | Huang | .............. H04W 36/0085 |
| 2019/0059109 | A1* | 2/2019 | Li | ........................... H04W 48/20 |
| 2019/0268840 | A1 | 8/2019 | Chen | |
| 2019/0320354 | A1 | 10/2019 | Kim et al. | |
| 2020/0314720 | A1 | 10/2020 | Tang | |
| 2021/0266809 | A1 | 8/2021 | Chen et al. | |
| 2022/0225224 | A1 | 7/2022 | Shi et al. | |

FOREIGN PATENT DOCUMENTS

| | | |
|---|---|---|
| CN | 105554857 A | 5/2016 |
| CN | 110536341 A | 12/2019 |
| CN | 111132254 A | 5/2020 |
| CN | 111565428 A | 8/2020 |
| CN | 111726844 A | 9/2020 |
| CN | 111641982 A | 1/2022 |
| WO | 2020092566 A1 | 5/2020 |

OTHER PUBLICATIONS

Zte Corporation et al., "Consideration on system information and cell (re)selection in NTN", 3GPP TSG-RAN WG2 Meeting #111, Electronic, Aug. 17-28, 2020, R2-2006872.

* cited by examiner

*Primary Examiner* — Ronald B Abelson
(74) *Attorney, Agent, or Firm* — The Webb Law Firm

(57) ABSTRACT

A cell reselection method includes obtaining target information of a first cell, where the target information is configured for indicating access information of the first cell; and determining, based on the target information and terminal capability information, the first cell as a candidate cell or a barred cell when cell reselection is performed.

15 Claims, 3 Drawing Sheets

<u>200</u>

S210

Obtain target information of a first cell

S220

Determine, based on the target information and terminal capability information, the first cell as a candidate cell or a barred cell when cell selection or reselection is performed

Figures 3, 4:
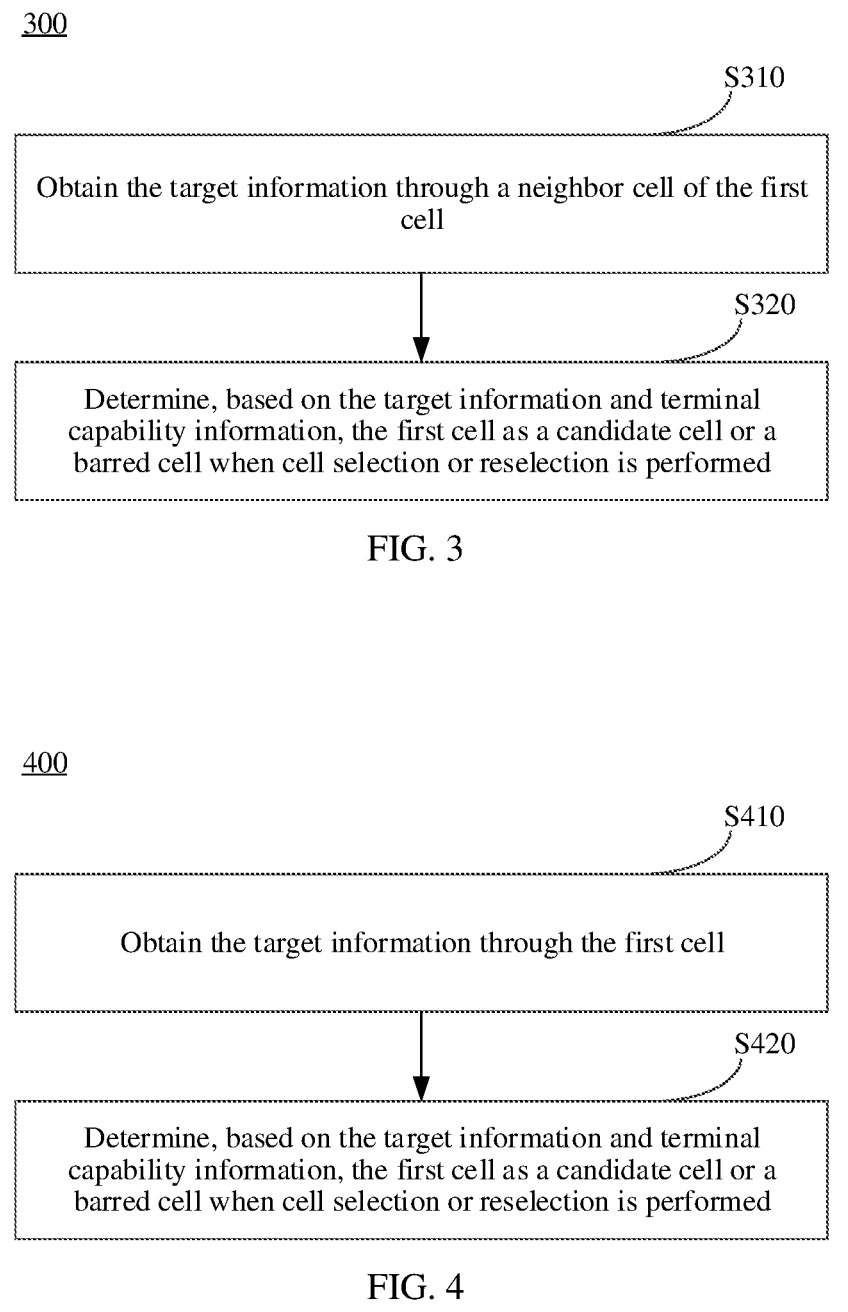

300

S310

Obtain the target information through a neighbor cell of the first cell

S320

Determine, based on the target information and terminal capability information, the first cell as a candidate cell or a barred cell when cell selection or reselection is performed

Obtain the target information through the first cell

S420

Determine, based on the target information and terminal capability information, the first cell as a candidate cell or a barred cell when cell selection or reselection is performed

CELL RESELECTION METHOD, TERMINAL, AND NON-TRANSITORY READABLE STORAGE MEDIUM

CROSS-REFERENCE TO RELATED APPLICATIONS

This application is a Bypass Continuation Application of International Patent Application No. PCT/CN2022/081455, filed Mar. 17, 2022, and claims priority to Chinese Patent Application No. 202110310837.6, filed Mar. 23, 2021, the disclosures of which are hereby incorporated by reference in their entireties.

BACKGROUND OF THE INVENTION

Field of the Invention

This application relates to the field of wireless communication technologies, and specifically, to a cell reselection method, a terminal, and a non-transitory readable storage medium.

Description of Related Art

With the development of wireless communication technology, the application of wireless networks is becoming increasingly widespread, and wireless access technology is also constantly evolving. For example, the 5th generation (5G) communication technology, also known as New Radio (NR) communication technology, has begun to be commercialized, and the integration of satellite communication and ground communication has also entered a research stage. The 3rd generation partnership project (3GPP) working group has also begun to study the integration of satellite communication and ground wireless access networks (such as ground 5G networks), building an integrated sea, land, air, and sky communication network to meet the diverse business needs of users, which is an important direction for future communication development.

Taking a terminal that only supports a terrestrial network (TN) as an example, during cell reselection or selection, an attempt may be made to reside or access a non-terrestrial network (NTN) cell and to obtain a normal service. However, because the terminal lacks an NTN access capability, the terminal is unable to access the NTN cell, such as normal registration of the terminal being rejected by the network. In this case, the terminal needs to reselect other cells to reside and attempt registration, which prolongs the time for the terminal to obtain the normal service and affects the performance of the wireless communication system.

SUMMARY

According to a first aspect, a cell reselection method is provided and performed by a terminal, where the method includes: obtaining target information of a first cell, where the target information is configured for indicating access information of the first cell; and determining, based on the target information and terminal capability information, the first cell as a candidate cell or a barred cell when cell reselection is performed.

According to a second aspect, a cell reselection apparatus is provided, where the apparatus includes: an obtaining module, configured to obtain target information of a first cell, where the target information is configured for indicating access information of the first cell; and a determining module, configured to determine, based on the target information and terminal capability information, the first cell as a candidate cell or a barred cell when cell reselection is performed.

According to a third aspect, a terminal is provided. The terminal includes a processor, a memory, and a program or instructions stored in the memory and executable on the processor, wherein when the program or the instructions are executed by the processor, steps of the method according to the first aspect are implemented.

According to a fourth aspect, a terminal is provided. The terminal includes a processor and a communication interface, where the communication interface is coupled to the processor, and the processor is configured to run a program or instructions, to implement steps of the method according to the first aspect.

According to a fifth aspect, a non-transitory readable storage medium is provided. The non-transitory readable storage medium stores a program or instructions, wherein when the program or the instructions are executed by the processor, steps of the method according to the first aspect are implemented.

According to a sixth aspect, a chip is provided. The chip includes a processor and a communication interface, where the communication interface is coupled to the processor, and the processor is configured to run a program or instructions, to implement steps of the method according to the first aspect.

According to a seventh aspect, a computer program product/program product is provided, where the computer program product/program product is stored in a non-volatile storage medium and executed by at least one processor to implement steps of the method according to the first aspect.

BRIEF DESCRIPTION OF THE DRAWINGS

FIG. 3 is a schematic flowchart of a cell reselection method according to another exemplary embodiment of this application.

FIG. 4 is a schematic flowchart of a cell reselection method according to still another exemplary embodiment of this application.

DESCRIPTION OF THE INVENTION

The following clearly describes the technical solutions in embodiments of this application with reference to the accompanying drawings in embodiments of this application. Apparently, the described embodiments are some but not all of the embodiments of this application. All other embodiments obtained by a person of ordinary skill in the art based on the embodiments of this application fall within the protection scope of this application.

The specification and claims of this application, and terms "first" and "second" are used to distinguish similar objects, but are unnecessarily used to describe a specific sequence or order. It should be understood that the terms in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" means at least one of the connected objects, and the character "/" generally indicates an "or" relationship between the associated objects.

It should be noted that, the technologies described in the embodiments of this application are not limited to a Long Term Evolution (LTE) system or an LTE-Advanced (LTE-A) system, and can also be used in other wireless communication systems, such as, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application are often used interchangeably, and the described technology can be used not only for the above systems and radio technologies, but also for other systems and radio technologies. The following description describes a new radio (NR) system for example objectives, and NR terms are used in most of the description below. These technologies are also applicable to applications other than NR system applications, such as a 6th generation (6G) communication system.

Figure 1:
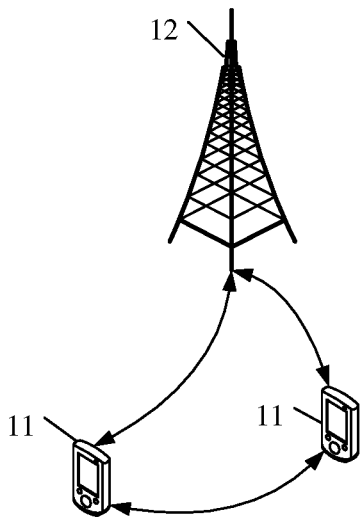
FIG. 1 is a schematic structural diagram of a wireless communication system according to an exemplary embodiment of this application.

FIG. 1 is a schematic structural diagram of a wireless communication system to which an embodiment of this application can be applied. The wireless communication system includes a terminal 11 and a network side device 12. The terminal 11 may also be referred to as a terminal device or a user equipment (UE). The terminal 11 may be, for example, a terminal-side device such as a mobile phone, a tablet personal computer, a laptop computer, a personal digital assistant (PDA), a palmtop computer, a netbook, an ultra-mobile personal computer (UMPC), a mobile Internet device (MID), a wearable device, an in-vehicle device, or a pedestrian terminal. The wearable device includes: a smartwatch, a bracelet, earphones, glasses, or the like. It should be noted that a specific type of the terminal 11 is not limited in the embodiments of this application. The network side device 12 may be a base station or a core network, where the base station may be referred to as a node B, an evolution node B, an access point, a base transceiver station (BTS), a radio base station, a radio transceiver, a basic service set (BSS), an extended service set (ESS), a B node, an evolutionary B node (eNB), a household B node, a household evolutionary B node, a WLAN access point, a WiFi node, a transmitting receiving point (TRP), or some other suitable term in the field, provided that the same technical effect is achieved, the base station is not limited to a particular technical term, and it should be noted that: In the embodiments of this application, only a base station in an NR system is taken as an example, but the specific type of the base station is not limited.

The technical solution provided in embodiments of this application is described in detail below through some embodiments and application scenarios thereof with reference to the accompanying drawings.

Figure 2:
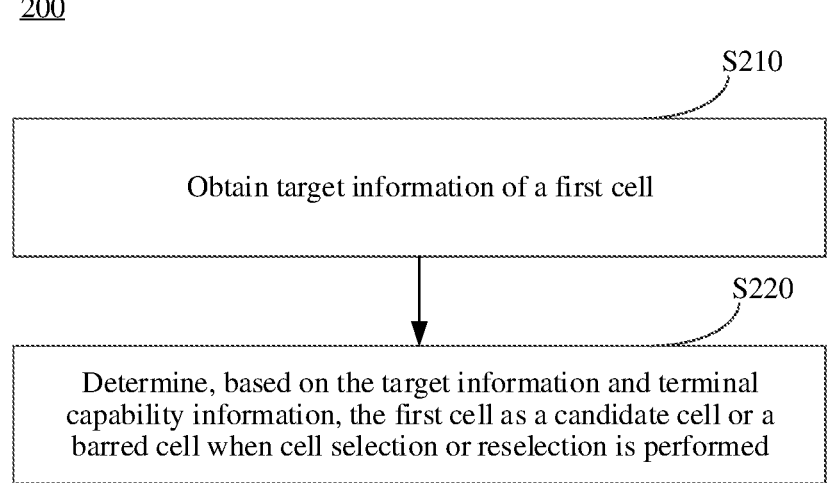
FIG. 2 is a schematic flowchart of a cell reselection method according to an exemplary embodiment of this application.

FIG. 2 is a schematic flowchart of a cell reselection method 200 according to an exemplary embodiment of this application. The method 200 may be executed by a terminal, but is not limited to, hardware and/or software installed in the terminal. In an embodiment, the method 200 may include at least following steps.

S210. Obtain target information of a first cell.

The target information is configured for indicating access information of the first cell. For example, access restriction information of the first cell, types of access services that the first cell can provide, or type information of terminals supported by the first cell. This is not limited in this embodiment.

In this embodiment, there can be a plurality of methods to obtain the target information. For example, in a possible implementation, the method for the terminal to obtain the target information of the first cell can include at least one of the following (1) and (2).

(1) Obtain the target information through a neighbor cell of the first cell.

The neighbor cell may be a cell that provides a service to the terminal, a cell in which the terminal resides, or a cell that has been previously resided in by the terminal. In this embodiment, there may be one or more neighbor cells of the first cell.

In an implementation, the terminal can obtain the target information through broadcast information of the neighbor cell (such as a system information block (SIB) 3, a SIB4, and the like) or downlink dedicated signaling (such as a radio Resource control release message (RRC Release message), so as to reduce the cost of measuring and obtaining the system message of the first cell by the terminal, thereby reducing the power consumption of the terminal.

(2) Obtain the target information through the first cell.

In a possible implementation, the terminal may obtain the target information through the broadcast information (such as a SIB1) of the first cell.

S220. Determine, based on the target information and terminal capability information, the first cell as a candidate cell or a barred cell when cell reselection is performed.

The terminal capability information is configured for indicating a cell access capability supported by the terminal, such as whether the terminal supports a TN cell access capability (or an NTN cell access capability), a dual connection cell access capability, a 4G cell access capability, a 5G cell access capability, and the like, which is not limited herein.

In addition, the foregoing cell reselection can be understood as that: The terminal is reselected from the currently residing or serving cell to a new cell, or the terminal performs initial cell selection, which is not limited in this embodiment.

In this embodiment, the terminal determines, based on the target information and terminal capability information, the first cell as a candidate cell or a barred cell when cell reselection is performed, which enables the terminal to determine that the first cell is a candidate cell or barred cell when cell reselection is performed before attempting to register in the resident first cell, thereby avoiding ineffective attempts by the terminal, reducing the delay for the terminal to receive a normal service, and ensuring the performance of the wireless communication system.

FIG. 3 is a schematic flowchart of a cell reselection method 300 according to an exemplary embodiment of this application. The method 300 may be executed by a terminal, but is not limited to, hardware and/or software installed in the terminal. In an embodiment, the method 300 may include at least following steps.

S310. Obtain the target information through a neighbor cell of the first cell.

The target information is configured for indicating access information of the first cell.

It can be understood that for the implementation process of S310, in addition to referring to the relevant description in the method embodiment 200, in a possible implementation, in a case that the terminal obtains the target information through a neighbor cell of the first cell, the target information includes at least one of the following (1) to (6).

(1) First information, including barred indication information of the first cell.

The barred indication information may be configured for indicating that the first cell is barred or retained.

For example, in a case that the first cell is an NTN cell, the neighbor cell can send the barred indication information of the first cell to the terminal.

(2) Second information, configured for indicating a service type of the first cell.

The service type can refer to the service type of the service that the first cell can provide, such as a TN access service, an NTN access service, a 4G cell access service, a 5G cell service, and the like.

In an implementation, the service type of the first cell can be indicated by the method described in (2a) or (2b) below.

(2a) Indicate in a display manner. For example, 1 bit can be used to indicate that the first cell is a cell of a specific service type (such as an NTN service type, a TN service type, and the like).

For example, it is assumed that the display indication of the second information is obtained through the broadcast message, a new indication domain can be introduced in the broadcast message. Taking the specific service type as the NIN service type as an example, if a value of the indication domain is true, it means that the service type of the first cell is the NTN service type, that is, the first cell is the NTN cell. If the value of the indicator domain is false or does not exist, it indicates that the service type of the first cell is the TN service type, that is, the first cell is the TN cell.

(2b) Indicate in an implicit manner. For example, if the neighbor cell provides relevant information about a specific service type of the first cell, then the first cell is a cell with the specific service type. For example, it is assumed that the neighbor cell provides information related to the first cell and the satellite, the service type of the first cell is an NTN service type, that is, the first cell is an NTN cell. If no information related to the first cell and the satellite is provided, the service type of the first cell is a TN service type, that is, the first cell is a TN cell.

(3) Third information, including a cell identifier list of a specific service type cell.

The specific service type may include but is not limited to an NTN service types, a TN service types, and the like. The cell identifier in the cell identifier list may be a physical cell identifier (PCI).

In this embodiment, in a possible implementation, the cell identifier list may be a PCI list of a cell with a specific service type reserved by the network. For example, a network side device can place some or all of the PCI of a neighbor cell (such as an NTN cell) of a specific service type in a list (that is a cell identifier list). When the PCI of the first cell is an element in the cell identifier list, it means that the first cell is a cell with a specific service type.

It can be understood that the design form of the cell identifier list can be various. For example, the cell identifier list can include one or more sublists, such as a list of neighbor cells of the current service cell, or a list of all NTN cells (not just neighbor cells of the current service cell), which is not limited herein.

(4) The first information and a first emergency service support indication, where the first emergency service support indication is configured for indicating that the first cell supports an emergency service.

For example, in a case that the first information indicates that the first cell is barred or retained, the first emergency service support indication may further indicate that the barred or retained first cell supports or does not support the emergency service.

For example, it is assumed that the first cell is a cell with a specific service type, the first emergency service support indication indicates that a terminal of the first cell supporting a first capability (such as the NTN access capability) and other terminals (a terminal with a second capability, such as a UE with the TN access capability) to access to obtain the emergency service.

It can be understood that the second capability includes other capabilities besides the first capability, for example, in a case that the first capability is the NTN access capability, the second capability may be the TN access capability.

(5) The second information and a second emergency service support indication, where the second emergency service support indication is configured for indicating that the first cell supports the emergency service.

It is assumed that the first cell is a cell with a specific service type, the second emergency service support indication indicates that a terminal of the first cell supporting a first capability (such as the NTN access capability) and other terminals (a terminal with a second capability (such as the TN access capability)) to access to obtain the emergency service.

(6) The third information and a third emergency service support indication, where the third emergency service support indication is configured for indicating that some or all of the cells corresponding to the cell identifier list support the emergency service.

In a possible implementation, a network side device can place cell identifiers (including the first cell) of some or all of neighbor cells (such as NTN cells) in a cell identifier list. When the cell identifier of the first cell (such as PCI) is an element in the cell identifier list, it means that the first cell is a cell with a specific service type.

In this embodiment, the specific implementation form of the cell identifier list can include at least one of the following (6a) to (6c).

(6a) In a case that the cell identifier list includes a sublist, the third emergency service support indication can be configured for indicating that all cells included in the cell identifier list support emergency services.

(6b) In a case that the cell identifier list includes two sublists, one sublist corresponds to a third emergency service support indication to indicate that all cells in the sublist support emergency services, and the other sublist does not have a third emergency service support indication to indicate that cells in the sublist do not support emergency services.

(6c) Each cell identifier (such as a PCI) in the cell identifier list corresponds to a third emergency service support indication, used to indicate that the corresponding cell supports an emergency service.

It should be noted that the first information may include, but is not limited to, one or more of (1) to (6).

S320. Determine, based on the target information and terminal capability information, the first cell as a candidate cell or a barred cell when cell reselection is performed.

For the implementation process of S320, in addition to referring to the relevant description in the method embodiment 200, in a possible implementation, the implementation process of "determine, based on the target information and terminal capability information, the first cell as a candidate cell or a barred cell when cell reselection is performed" described in S320 can include at least one of the following (1) to (12). It should be noted that the "determining the first cell as a candidate cell (or barred cell)" in this embodiment of this application can be understood as that: the first cell is viewed as a candidate cell (or barred cell), or it can also be understood as that: the first cell is used as a candidate cell (or barred cell), and the like, which is not limited herein.

(1) Determine, in a case that the target information includes the first information and the terminal capability information indicates that the terminal has a first capability, the first cell as the candidate cell.

(2) Determine, in a case that the target information includes the first information and the terminal capability information indicates that the terminal has a second capability, the first cell as the barred cell.

For example, in the foregoing (1) and (2), if the target information includes the first information, the terminal with the first capability (such as the NTN access capability) ignores the first information or does not perform the behavior indicated by the first information, determines the first cell as a candidate cell, and performs subsequent cell reselection steps such as measurement, cell access, and the like. Conversely, if the target information includes the first information, the terminal with the second capability (such as the TN access capability) determines that the first cell is a barred cell, that is, no longer performs cell reselection operations on the first cell.

It should be noted that the first capability and the second capability can be set according to actual needs. For example, the first capability can include not only the NTN access capability, but also the TN access capability, and the like. Corresponding to the first capability, the second capability may include other capabilities besides the first capability, for example, in a case that the first capability is the NTN access capability, the second capability may be the TN access capability, which is not limited herein.

(3) Determine, in a case that the target information includes the second information and a terminal capability indicated by the terminal capability information matches a cell service type indicated by the second information, the first cell as the candidate cell.

(4) Determine, in a case that the target information includes the second information and the terminal capability indicated by the terminal capability information does not match the cell service type indicated by the second information, the first cell as the barred cell;

In the foregoing (3) and (4), it is assumed that the cell service type is an NTN service type, and the terminal capability indicated by the terminal capability information is an NTN access capability, then the terminal capability matches the service type. Therefore, the terminal can determine the first cell as a candidate cell and continue to perform subsequent cell reselection steps, such as measurement. However, if the terminal capability indicated by the terminal capability information is a TN access capability, then the terminal capability does not match the service type. Therefore, the terminal determines the first cell as a barred cell and no longer performs cell reselection operations on the first cell.

(5) Determine, in a case that the target information includes the third information, a cell identifier list in the third information includes an identifier of the first cell, and the terminal capability information indicates that the terminal has the first capability, the first cell as the candidate cell.

(6) Determine, in a case that the target information includes the third information, a cell identifier list in the third information includes an identifier of the first cell, and the terminal capability information indicates that the terminal has the second capability, the first cell as the barred cell.

In the foregoing (5) and (6), in a case that the cell identifier is the PCI of the cell, if the PCI of the first cell is an element in the cell identifier list, and the terminal capability indicated by the terminal capability information is the NTN access capability (that is, the first capability), then the terminal determines the first cell as a candidate cell and performs subsequent cell reselection operations. Conversely, if the PCI of the first cell is an element in the cell identifier list, and the terminal capability indicated by the terminal capability information is the TN access capability (that is, the second capability), then the terminal determines the first cell as a barred cell and no longer performs cell reselection operations on the first cell.

(7) Determine, in a case that the target information includes the first information and the first emergency service support indication, and the terminal capability information indicates that the terminal has the first capability, the first cell as the candidate cell.

(8) Determine, in a case that the target information includes the first information and the first emergency service support indication, and the terminal capability information indicates that the terminal has the second capability, the first cell as the candidate cell which only provides an emergency service.

In the foregoing (7) and (8), it is assumed that the target information includes the first information and the first emergency service support indication, and the terminal capability information indicates that the terminal has an NTN access capability (that is, the first capability), then the terminal ignores the first information and the first emergency service support indication, or does not perform the behavior indicated by the first information and the first emergency service support indication, and determines the first cell as a candidate cell, that is, performs subsequent cell reselection steps, such as measurement.

Conversely, it is assumed that the target information includes the first information and the first emergency service support indication, and the terminal capability information indicates that the terminal has the TN access capability (that is, the second capability), the terminal can determine the first cell as a candidate cell that only provides the emergency service, and may perform subsequent cell reselection steps (for example, when emergency services need to be initiated by residing in the cell), such as measurement. In addition, if the first cell further meets an S criterion, the terminal can determine the first cell as an acceptable cell, that is, a candidate cell that only provides the emergency service.

(9) Determine, in a case that the target information includes the second information and the second emergency service support indication, and the terminal capability indicated by the terminal capability information matches the cell service type indicated by the second information, the first cell as the candidate cell.

(10) Determine, in a case that the target information includes the second information and the second emergency service support indication, and the terminal capability indicated by the terminal capability information does not match the cell service type indicated by the second information, the first cell as the candidate cell which only provides the emergency service.

In the foregoing (9) and (10), it is assumed that the second information indicates that the first cell is an NTN cell, and the terminal capability indicated by the terminal capability information is an NTN access capability, then the terminal capability matches the terminal capability with the cell service type indicated by the second information. Therefore, the terminal can determine the first cell as a candidate cell and perform subsequent cell reselection steps, such as measurement.

Conversely, it is assumed that the second information indicates that the first cell is an NTN cell, and the terminal capability indicated by the terminal capability information is a TN access capability, then the terminal capability indicated by the terminal capability information does not match the cell service type indicated by the second information. Therefore, the terminal can determine the first cell as a candidate cell that only provides emergency services and may perform subsequent cell reselection steps (for example, when it is necessary to reside in a community to initiate emergency services), such as measurement. In addition, if the first cell further meets the S criterion, the terminal can determine the first cell as an acceptable cell.

(11) Determine, in a case that the target information includes the third information and the third emergency service support indication, the cell identifier list in the third information includes the identifier of the first cell, the third emergency service support indication indicates the first cell supports the emergency service, and the terminal capability information indicates that the terminal has the first capability, the first cell as the candidate cell.

(12) Determine, in a case that the target information includes the third information and the third emergency service support indication, the cell identifier list in the third information includes the identifier of the first cell, the third emergency service support indication indicates the first cell supports the emergency service, and the terminal capability information indicates that the terminal has the second capability, the first cell as the candidate cell which only provides the emergency service.

In the foregoing (11) and (12), if the third information is a PCI list of NTN cells reserved by the network, the PCI of the first cell is an element in the PCI list, and the terminal capability information indicates that the terminal has an NTN access capability (that is, the first capability), then the terminal can determine the first cell as a candidate cell and perform subsequent cell reselection steps, such as measurement.

Conversely, if the third information is the PCI list of NTN cells reserved by the network, the PCI of the first cell is an element in the PCI list, and the terminal capability information indicates that the terminal has a TN access capability (that is, the second capability), then the terminal determines the first cell as a candidate cell that only provides emergency services, and may perform subsequent cell reselection steps (such as when emergency services need to be initiated by residing in the cell), such as measurement. In addition, if the first cell further meets the S criterion, the terminal can determine the first cell as an acceptable cell.

It can be understood that the first capability in (1) to (12) is the NTN access capability, or the second capability is the TN access capability, which is only one example. In this embodiment, the first capability may also be other access capabilities, and to avoid repetition, it will not be repeated here.

In this embodiment, the terminal obtains target information before attempting cell registration in the resident first cell, and based on the target information and the terminal capability information to determine whether the first cell is a candidate cell that can provide normal services, a candidate cell that can provide emergency services, or a barred cell, which avoids ineffective attempts by the terminal, reduces the delay for the terminal to obtain normal services, and ensures the performance of the wireless communication system.

In addition, the terminal obtains the target information through the neighbor cell of the first cell, so that before obtaining the SIB1 of the first cell, the terminal can determine whether the first cell is a barred cell or a candidate cell, which can reduce the cost of terminal measurement and obtaining system messages, thereby reducing terminal power consumption.

FIG. 4 is a schematic flowchart of a cell reselection method 400 according to an exemplary embodiment of this application. The method 400 may be executed by a terminal, but is not limited to, hardware and/or software installed in the terminal. In an embodiment, the method 400 may include at least following steps.

S410. Obtain the target information through the first cell.

The target information is configured for indicating access information of the first cell.

It can be understood that for the implementation process of S410, in addition to referring to the description in the method embodiments 200 or 300, in a possible implementation, the process of the terminal obtaining the target information through the first cell may include: obtaining the target information through the broadcast information (such as a SIB1) of the first cell.

In this case, the target information includes at least one of (1) to (4).

(1) Fourth information, including barred indication information of the first cell.

The barred indication information is configured for indicating whether the first cell is reserved or barred.

For example, in a case that the first cell is an NTN cell, the first cell can send the barred indication information of the first cell to the terminal.

(2) Fifth information, configured for indicating a service type of the first cell.

The service type can refer to the service type of the service that the first cell can provide, such as a TN access service, an NTN service, and the like.

In an implementation, the service type of the first cell can be indicated by the method described in (2a) or (2b) below.

(2a) Indicate in a display manner. For example, 1 bit can be used to indicate that the first cell is a cell of a specific service type (such as an NTN service type, a TN service type, and the like).

For example, it is assumed that the display indication of the fifth information is obtained through the broadcast message, a new indication domain can be introduced in the broadcast message. Taking the specific service type as the NIN service type as an example, if a value of the indication domain is true, it means that the service type of the first cell is the NTN service type, that is, the first cell is the NTN cell. If the value of the indicator domain is false or does not exist, it indicates that the service type of the first cell is the TN service type, that is, the first cell is the TN cell.

(2b) Indicate in an implicit manner. For example, if the first cell provides relevant information about a specific service type, then the first cell is a cell with the specific type. For example, it is assumed that the first cell provides information related to the satellite, the service type of the first cell is an NTN service type, that is, the first cell is a TN cell. If no information related to the first cell and the satellite is provided, the service type of the first cell is a TN service type, that is, the first cell is a TN cell.

(3) The fourth information and a fourth emergency service support indication, where the fourth emergency service support indication is configured for indicating that the first cell supports an emergency service.

It is assumed that the first cell is a cell with a specific service type, the fourth emergency service support indication indicates that a terminal of the first cell supporting a first capability (such as the NTN access capability) and other terminals (a terminal with a second capability (such as a terminal with the TN access capability)) to access to obtain the emergency service.

It can be understood that the second capability includes other capabilities besides the first capability, for example, in a case that the first capability is the NTN access capability, the second capability may be the TN access capability.

(4) The fifth information and a fifth emergency service support indication, where the fifth emergency service support indication is configured for indicating that the first cell supports the emergency service.

It is assumed that the first cell is a cell with a specific service type, the fifth emergency service support indication indicates that a terminal of the first cell supporting a first capability (such as the NTN access capability) and other terminals (a terminal with a second capability (such as the TN access capability)) to access to obtain the emergency service.

S420. Determine, based on the target information and terminal capability information, the first cell as a candidate cell or a barred cell when cell reselection is performed.

For the implementation process of S420, in addition to referring to the relevant description in the method embodiment 200 or 300, in a possible implementation, the implementation process of "determine, based on the target information and terminal capability information, the first cell as a candidate cell or a barred cell when cell reselection is performed" described in S420 can include at least one of the following (1) to (8).

(1) Determine, in a case that the target information includes the fourth information and the terminal capability information indicates that the terminal has a first capability, the first cell as the candidate cell.

(2) Determine, in a case that the target information includes the fourth information and the terminal capability information indicates that the terminal has a second capability, the first cell as the barred cell.

In the foregoing (1) and (2), it is assumed that the target information includes the third information, and the terminal capability information indicates that the terminal has a first capability (such as an NTN access capability), the terminal can ignore the fourth information or do not perform the behavior indicated by the fourth information to determine the first cell as a candidate cell, that is, perform subsequent cell reselection steps, such as determining whether the highest ranked cell is a suitable cell.

Conversely, it is assumed that the target information includes the third information, and the terminal capability information indicates that the terminal has a second capability (such as a TN access capability), the terminal can determine the first cell as a barred cell, that is, no longer perform cell reselection operations on the first cell.

(3) Determine, in a case that the target information includes the fifth information and a terminal capability indicated by the terminal capability information matches a service type of the first cell indicated by the fifth information, the first cell as the candidate cell.

(4) Determine, in a case that the target information includes the fifth information and the terminal capability indicated by the terminal capability information does not match the service type of the first cell indicated by the fifth information, the first cell as the barred cell.

In the foregoing (3) and (4), it is assumed that the cell service type is an NTN service type, and the terminal capability indicated by the terminal capability information is an NTN access capability, then the terminal capability matches the service type. Therefore, the terminal can determine the first cell as a candidate cell and continue to perform subsequent cell reselection steps, such as measurement. However, if the terminal capability indicated by the terminal capability information is a TN access capability, then the terminal capability does not match the service type. Therefore, the terminal determines the first cell as a barred cell and no longer performs cell reselection operations on the first cell.

(5) Determine, in a case that the target information includes the fourth information and the fourth emergency service support indication, and the terminal capability information indicates that the terminal has the first capability, the first cell as the candidate cell.

(6) Determine, in a case that the target information includes the fourth information and the fourth emergency service support indication, and the terminal capability information indicates that the terminal has the second capability, the first cell as the candidate cell which only provides an emergency service.

In the foregoing (5) and (6), it is assumed that the target information includes the fourth information and the fourth emergency service support indication, and the terminal capability information indicates that the terminal has an NTN access capability (that is, the first capability), then the terminal ignores the fourth information and the fourth emergency service support indication, or does not perform the behavior indicated by the fourth information and the fourth emergency service support indication, and determines the first cell as a candidate cell, that is, performs subsequent cell reselection steps, such as measurement.

Conversely, it is assumed that the target information includes the fourth information and the fourth emergency service support indication, and the terminal capability information indicates that the terminal has the TN access capability (that is, the second capability), the terminal can determine the first cell as a candidate cell that only provides the emergency service, and may perform subsequent cell reselection steps (for example, when emergency services need to be initiated by residing in the cell), such as measurement. In addition, if the first cell further meets an S criterion, the terminal can determine the first cell as an acceptable cell, that is, a candidate cell that only provides the emergency service.

(7) Determine, in a case that the target information includes the fifth information and the fifth emergency service support indication, and the terminal capability indicated by the terminal capability information matches the service type of the first cell indicated by the fifth information, the first cell as the candidate cell.

(8) Determine, in a case that the target information includes the fifth information and the fifth emergency service support indication, but the terminal capability indicated by the terminal capability information does not match the service type of the first cell indicated by the fifth information, the first cell as the candidate cell which only provides the emergency service.

In the foregoing (7) and (8), it is assumed that the fifth information indicates that the first cell is an NTN cell, and the terminal capability indicated by the terminal capability information is an NTN access capability, then the terminal capability matches the terminal capability with the cell service type indicated by the fifth information. Therefore, the terminal can determine the first cell as a candidate cell and perform subsequent cell reselection steps, such as measurement.

Conversely, it is assumed that the fifth information indicates that the first cell is an NTN cell, and the terminal capability indicated by the terminal capability information is a TN access capability, then the terminal capability and the terminal capability do not match the cell service type indicated by the fifth information. Therefore, the terminal can determine the first cell as a candidate cell that only provides emergency services and may perform subsequent cell reselection steps (for example, when it is necessary to reside in a community to initiate emergency services), such as measurement. In addition, if the first cell further meets the S criterion, the terminal can determine the first cell as an acceptable cell.

It can be understood that the first capability in (1) to (8) is the NTN access capability, or the second capability is the TN access capability, which is only one example. In this embodiment, the first capability may also be other access capabilities, and to avoid repetition, it will not be repeated here.

In this embodiment, the terminal obtains target information before attempting cell registration in the resident first cell, and based on the target information and the terminal capability information to determine whether the first cell is a candidate cell that can provide normal services, a candidate cell that can provide emergency services, or a barred cell, which avoids ineffective attempts by the terminal, reduces the delay for the terminal to obtain normal services, and ensures the performance of the wireless communication system.

It should be noted that the cell reselection methods 200 to 400 provided in embodiments of this application can be executed by a cell reselection apparatus, or by a control module for executing the cell reselection method in the cell reselection apparatus. The subsequent part of the embodiments of this application takes an example in which the cell reselection apparatus performs the cell reselection method to illustrate the cell reselection apparatus provided in the embodiment of this application.

Figure 5:
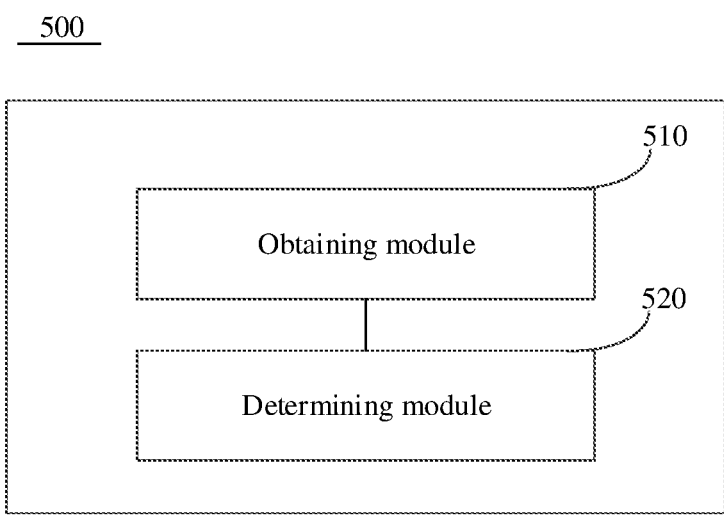
FIG. 5 is a schematic block structural diagram of a cell reselection apparatus according to an exemplary embodiment of this application.

FIG. 5 is a schematic block structural diagram of a cell reselection apparatus 500 according to an exemplary embodiment of this application. The apparatus 500 includes: an obtaining module 510, configured to obtain target information of a first cell, where the target information is configured for indicating access information of the first cell; and a determining module 520, configured to determine, based on the target information and terminal capability information, the first cell as a candidate cell or a barred cell when cell reselection is performed.

In a possible implementation, the obtaining module 510 is configured to perform at least one of the following: obtaining the target information through a neighbor cell of the first cell; or obtaining the target information through the first cell.

In another possible implementation, the obtaining module 510 is configured to obtain the target information through broadcast information or downlink dedicated signaling of the neighbor cell of the first cell; or the obtaining module is configured to obtain the target information through broadcast information of the first cell.

In another possible implementation, in a case that the target information is obtained through the neighbor cell of the first cell, the target information includes at least one of the following: first information, including barred indication information of the first cell; second information, configured for indicating a service type of the first cell; third information, including a cell identifier list of a specific service type cell; the first information and a first emergency service support indication, where the first emergency service support indication is configured for indicating that the first cell supports an emergency service; the second information and a second emergency service support indication, where the second emergency service support indication is configured for indicating that the first cell supports the emergency service; or the third information and a third emergency service support indication, where the third emergency service support indication is configured for indicating that some or all of cells corresponding to the cell identifier list support the emergency service.

In a possible implementation, the determining module 520 is configured to perform at least one of the following: determining, in a case that the target information includes the first information and the terminal capability information indicates that the terminal has a first capability, the first cell as the candidate cell; determining, in a case that the target information includes the first information and the terminal capability information indicates that the terminal has a second capability, the first cell as the barred cell; determining, in a case that the target information includes the second information and a terminal capability indicated by the terminal capability information matches a cell service type indicated by the second information, the first cell as the candidate cell; determining, in a case that the target information includes the second information and the terminal capability indicated by the terminal capability information does not match the cell service type indicated by the second information, the first cell as the barred cell; determining, in a case that the target information includes the third information, a cell identifier list in the third information includes an identifier of the first cell, and the terminal capability information indicates that the terminal has the first capability, the first cell as the candidate cell; determining, in a case that the target information includes the third information, a cell identifier list in the third information includes an identifier of the first cell, and the terminal capability information indicates that the terminal has the second capability, the first cell as the barred cell; determining, in a case that the target information includes the first information and the first emergency service support indication, and the terminal capability information indicates that the terminal has the first capability, the first cell as the candidate cell; determining, in a case that the target information includes the first information and the first emergency service support indication, and the terminal capability information indicates that the terminal has the second capability, the first cell as the candidate cell which only provides an emergency service; determining, in a case that the target information includes the second information and the second emergency service support indication, and the terminal capability indicated by the terminal capability information matches the cell service type indicated by the second information, the first cell as the candidate cell; determining, in a case that the target information includes the second information and the second emergency service support indication, and the terminal capability indicated by the terminal capability information does not match the cell service type indicated by the second information, the first cell as the candidate cell which only provides the emergency service; determining, in a case that the target information includes the third information and the third emergency service support indication, the cell identifier list in the third information includes the identifier of the first cell, the third emergency service support indication indicates the first cell supports the emergency service, and the terminal capability information indicates that the terminal has the first capability, the first cell as the candidate cell; or determining, in a case that the target information includes the third information and the third emergency service support indication, the cell identifier list in the third information includes the identifier of the first cell, the third emergency service support indication indicates the first cell supports the emergency service, and the terminal capability information indicates that the terminal has the second capability, the first cell as the candidate cell which only provides the emergency service.

In another possible implementation, in a case that the target information is obtained through the first cell, the target information includes at least one of the following: fourth information, including barred indication information of the first cell; fifth information, configured for indicating a service type of the first cell; the fourth information and a fourth emergency service support indication, where the fourth emergency service support indication is configured for indicating that the first cell supports an emergency service; or the fifth information and a fifth emergency service support indication, where the fifth emergency service support indication is configured for indicating that the first cell supports the emergency service.

In a possible implementation, the determining module is configured to perform at least one of the following: determining, in a case that the target information includes the fourth information and the terminal capability information indicates that the terminal has a first capability, the first cell as the candidate cell; determining, in a case that the target information includes the fourth information and the terminal capability information indicates that the terminal has a second capability, the first cell as the barred cell; determining, in a case that the target information includes the fifth information and a terminal capability indicated by the terminal capability information matches a service type of the first cell indicated by the fifth information, the first cell as the candidate cell; determining, in a case that the target information includes the fifth information and the terminal capability indicated by the terminal capability information does not match the service type of the first cell indicated by the fifth information, the first cell as the barred cell; determining, in a case that the target information includes the fourth information and the fourth emergency service support indication, and the terminal capability information indicates that the terminal has the first capability, the first cell as the candidate cell; determining, in a case that the target information includes the fourth information and the fourth emergency service support indication, and the terminal capability information indicates that the terminal has the second capability, the first cell as the candidate cell which only provides an emergency service; determining, in a case that the target information includes the fifth information and the fifth emergency service support indication, and the terminal capability indicated by the terminal capability information matches the service type of the first cell indicated by the fifth information, the first cell as the candidate cell; or determining, in a case that the target information includes the fifth information and the fifth emergency service support indication, but the terminal capability indicated by the terminal capability information does not match the service type of the first cell indicated by the fifth information, the first cell as the candidate cell which only provides the emergency service.

In another possible implementation, the specific service type cell includes a non-terrestrial network NTN cell; and/or the first capability includes an NTN access capability, and the second capability includes other capabilities other than the first capability.

The cell reselection apparatus 500 in this embodiment of this application may be an apparatus, an apparatus or an electronic device with an operating system, or a component, an integrated circuit, or a chip in a terminal. The apparatus or the electronic device may be a mobile terminal or may be a non-mobile terminal. For example, the mobile terminal may include, but is not limited to, the types of terminal 11 listed above, and the non-mobile terminal may be a server, a network attached storage (NAS), a personal computer (PC), a television (TV), a teller machine, or a self-service machine, and the like, and the embodiments of this application are not specifically limited.

The cell reselection apparatus 500 provided in the embodiments of this application can implement all processes implemented by the method embodiments of FIG. 2 to FIG. 4, and the same technical effects are achieved. To avoid repetition, details are not described herein again.

Figure 6:
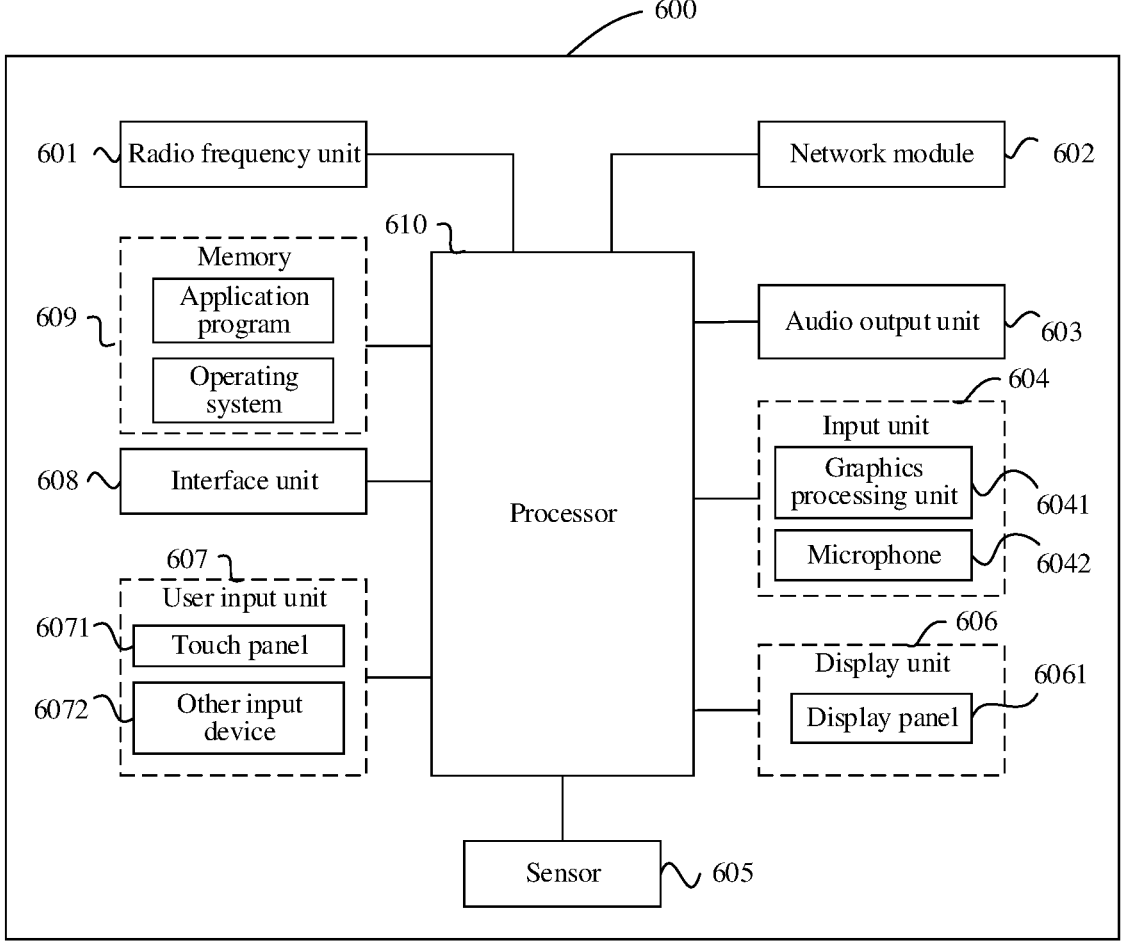
FIG. 6 is a schematic block structural diagram of a terminal according to an exemplary embodiment of this application.

An embodiment of this application further provides a terminal, including a processor and a communication interface, where the communication interface is coupled to the processor, and the processor is configured to run a program or instructions, to implement the method according to the method embodiments 200 to 400. The terminal embodiment corresponds to the above terminal side method embodiment, and the various implementation processes and implementations of the above method embodiments can be applied to the terminal embodiment, and can achieve the same technical effect. Optionally, FIG. 6 is a schematic diagram of a hardware structure of a terminal that implements the embodiments of this application. The terminal 600 includes, but is not limited to: at least some components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the terminal 600 further includes a power supply (such as a battery) for supplying power to the components. The power supply may logically connect to the processor 610 by using a power supply management system, thereby implementing functions, such as charging, discharging, and power consumption management, by using the power supply management system. A terminal structure shown in FIG. 6 does not constitute a limitation to the terminal, and the terminal may include more or fewer components than those shown in the figure, or some components may be combined, or a different component deployment may be used. Details are not described herein again.

It should be understood that, in this embodiment of this application, the input unit 604 may include a graphics processing unit (GPU) 6041 and a microphone 6042. The graphics processing unit 6041 performs processing on image data of a static picture or a video that is obtained by an image acquisition apparatus (for example, a camera) in a video acquisition mode or an image acquisition mode. The display unit 606 may include a display panel 6061, for example, the display panel 6061 may be configured in a form such as a liquid crystal display or an organic light-emitting diode. The user input unit 607 includes a touch panel 6071 and another input device 6072. The touch panel 6071 is also referred to as a touch screen. The touch panel 6071 may include two parts: a touch detection apparatus and a touch controller. The another input device 6072 may include, but is not limited to, a physical keyboard, a functional key (such as a volume control key or a switch key), a track ball, a mouse, and a joystick, and details are not described herein again.

In this embodiment of this application, the radio frequency unit 601 receives downlink data from a network side device and transmits downlink data to the processor 610 for processing. In addition, uplink data is transmitted to the network side device. Generally, the radio frequency unit 601 includes, but is not limited to, an antenna, at least one amplifier, a transceiver, a coupler, a low noise amplifier, a duplexer, and the like.

The memory 609 may be configured to store a software program or instruction and various data. The memory 609 may mainly include a program or instruction storage region and a data storage region. The program or instruction storage region may store an operating system, an application program or instruction required by at least one function (for example, a sound playback function and an image playback function), or the like. The memory 609 may include a high speed random access memory, and may also include a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. For example, the nonvolatile memory may be at least one magnetic disk storage device, a flash memory device, or other volatile solid-state storage devices.

The processor 610 may include one or more processing units. Optionally, the processor 610 may integrate an application processor and a modem. The application processor mainly processes an operating system, a user interface, an application program or instruction, and the like. The modem mainly processes wireless communication, such as a baseband processor. It may be understood that the foregoing modem processor may either not be integrated into the processor 610.

The processor 610 is configured to obtain target information of a first cell, where the target information is configured for indicating access information of the first cell; and determine, based on the target information and terminal capability information, the first cell as a candidate cell or a barred cell when cell reselection is performed.

In the embodiments of this application, before attempting to perform cell access, the terminal obtains the target information of the first cell, and based on the target information and terminal capability information, to determine that the first cell is a candidate cell or a barred cell for cell reselection. The target information is configured for indicating the access information of the first cell. Therefore, it is possible for the terminal to determine the candidate cell or the barred cell before attempting cell access, thereby avoiding ineffective attempts during cell access and reducing the delay for the terminal to obtain the normal service.

An embodiment of this application further provides a non-transitory readable storage medium, storing a program or instruction. The program or instruction, when executed by a processor, implements all processes of the foregoing cell reselection method embodiments, and can achieve the same technical effects. To avoid repetition, details are not described herein again.

The processor is a processor in the terminal in the foregoing embodiments. The non-transitory readable storage medium includes a non-transitory computer-readable storage medium, for example, a computer read-only memory (ROM), a random access memory (RAM), a magnetic disk, or an optical disc.

An embodiment of this application further provides a chip, including: a processor and a communication interface, where the communication interface is coupled to the processor, and the processor is configured to run a network side device program or an instruction, to implement all processes of the foregoing cell reselection method embodiments, and can achieve the same technical effects. To avoid repetition, details are not described herein again.

It should be understood that, the chip described in the embodiments of this application may also be referred to as a system-level chip, a system chip, a chip system, a system on chip, or the like.

An embodiment of this application further provides a computer program product, including a processor, a memory, and a program or instructions stored on the memory and executable on the processor. The program or the instructions, when executed by the processor, implements all processes of the foregoing cell reselection method embodiments, and can achieve the same technical effects. To avoid repetition, details are not described herein again.

It should be noted that in this specification, "include", "comprise", and any variants are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses. In addition, it should be pointed out that the scope of the methods and apparatuses in the embodiments of this application is not limited to performing the functions in the order shown or discussed, but also can include performing the functions in basically the same way or in the opposite order according to the functions involved, for example, the described methods can be performed in a different order from the described ones, and various steps can also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the reflected technologies may be implemented in the form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. A cell reselection method, performed by a terminal, wherein the method comprises:

obtaining target information of a first cell, wherein the target information is configured for indicating access information of the first cell; and determining, based on the target information and terminal capability information, the first cell as a candidate cell or a barred cell when cell reselection is performed;

wherein the obtaining target information of a first cell comprises at least one of:

obtaining the target information through a neighbor cell of the first cell; or obtaining the target information through the first cell;

wherein in a case that the target information is obtained through the neighbor cell of the first cell, the target information comprises at least one of:

first information, comprising barred indication information of the first cell;

second information, configured for indicating a service type of the first cell;

third information, comprising a cell identifier list of a specific service type cell;

the first information and a first emergency service support indication, wherein the first emergency service support indication is configured for indicating that the first cell supports an emergency service;

the second information and a second emergency service support indication, wherein the second emergency service support indication is configured for indicating that the first cell supports the emergency service; or the third information and a third emergency service support indication, wherein the third emergency service support indication is configured for indicating that some or all of cells corresponding to the cell identifier list support the emergency service;

wherein in a case that the target information is obtained through the first cell, the target information comprises at least one of:

fourth information, comprising barred indication information of the first cell;

the fourth information and a fourth emergency service support indication, wherein the fourth emergency service support indication is configured for indicating that the first cell supports an emergency service; or fifth information and a fifth emergency service support indication, the fifth information is configured for indicating a service type of the first cell, wherein the fifth emergency service support indication is configured for indicating that the first cell supports the emergency service.

2. The method according to claim 1, wherein the obtaining the target information through a neighbor cell of the first cell comprises:

obtaining the target information through broadcast information or downlink dedicated signaling of the neighbor cell of the first cell; and the obtaining the target information through the first cell comprises:

obtaining the target information through broadcast information of the first cell.

3. The method according to claim 1, wherein the determining, based on the target information and terminal capability information, the first cell as a candidate cell or a barred cell comprises at least one of:

determining, in a case that the target information comprises the first information and the terminal capability information indicates that the terminal has a first capability, the first cell as the candidate cell;

determining, in a case that the target information comprises the first information and the terminal capability information indicates that the terminal has a second capability, the first cell as the barred cell;

determining, in a case that the target information comprises the second information and a terminal capability indicated by the terminal capability information matches a cell service type indicated by the second information, the first cell as the candidate cell;

determining, in a case that the target information comprises the second information and the terminal capability indicated by the terminal capability information does not match the cell service type indicated by the second information, the first cell as the barred cell;

determining, in a case that the target information comprises the third information, a cell identifier list in the third information includes an identifier of the first cell, and the terminal capability information indicates that the terminal has the first capability, the first cell as the candidate cell;

determining, in a case that the target information comprises the third information, the cell identifier list in the third information includes the identifier of the first cell, and the terminal capability information indicates that the terminal has the second capability, the first cell as the barred cell;

determining, in a case that the target information comprises the first information and the first emergency service support indication, and the terminal capability information indicates that the terminal has the first capability, the first cell as the candidate cell;

determining, in a case that the target information comprises the first information and the first emergency service support indication, and the terminal capability information indicates that the terminal has the second capability, the first cell as a candidate cell which only provides the emergency service;

determining, in a case that the target information comprises the second information and the second emergency service support indication, and the terminal capability indicated by the terminal capability information matches the cell service type indicated by the second information, the first cell as the candidate cell;

determining, in a case that the target information comprises the second information and the second emergency service support indication, and the terminal capability indicated by the terminal capability information does not match the cell service type indicated by the second information, the first cell as the candidate cell which only provides the emergency service;

determining, in a case that the target information comprises the third information and the third emergency service support indication, the cell identifier list in the third information includes the identifier of the first cell, the third emergency service support indication indicates the first cell supports the emergency service, and the terminal capability information indicates that the terminal has the first capability, the first cell as the candidate cell; or determining, in a case that the target information comprises the third information and the third emergency service support indication, the cell identifier list in the third information includes the identifier of the first cell, the third emergency service support indication indicates that the first cell supports the emergency service, and the terminal capability information indicates that the terminal has the second capability, the first cell as the candidate cell which only provides the emergency service.

4. The method according to claim 1, wherein the determining, based on the target information and terminal capability information, the first cell as a candidate cell or a barred cell comprises at least one of:

determining, in a case that the target information comprises the fourth information and the terminal capability information indicates that the terminal has a first capability, the first cell as the candidate cell;

determining, in a case that the target information comprises the fourth information and the terminal capability information indicates that the terminal has a second capability, the first cell as the barred cell;

determining, in a case that the target information comprises the fourth information and the fourth emergency service support indication, and the terminal capability information indicates that the terminal has the first capability, the first cell as the candidate cell;

determining, in a case that the target information comprises the fourth information and the fourth emergency service support indication, and the terminal capability information indicates that the terminal has the second capability, the first cell as the candidate cell which only provides an emergency service;

determining, in a case that the target information comprises the fifth information and the fifth emergency service support indication, and the terminal capability indicated by the terminal capability information matches the service type of the first cell indicated by the fifth information, the first cell as the candidate cell; or determining, in a case that the target information comprises the fifth information and the fifth emergency service support indication, and the terminal capability indicated by the terminal capability information does not match the service type of the first cell indicated by the fifth information, the first cell as the candidate cell which only provides the emergency service.

5. The method according to claim 1, wherein the specific service type cell comprises a non-terrestrial network (NTN) cell; and/or a first capability comprises an NTN access capability, and a second capability comprises other capabilities other than the first capability.

6. A terminal, comprising a processor, a memory, and a program or instructions stored in the memory and executable on the processor, wherein the program or the instructions, when executed by the processor, cause the terminal to perform:

obtaining target information of a first cell, wherein the target information is configured for indicating access information of the first cell; and determining, based on the target information and terminal capability information, the first cell as a candidate cell or a barred cell when cell reselection is performed;

wherein the program or the instructions, when executed by the processor, cause the terminal to perform at least one of:

obtaining the target information through a neighbor cell of the first cell; or obtaining the target information through the first cell;

wherein in a case that the target information is obtained through the neighbor cell of the first cell, the target information comprises at least one of:

first information, comprising barred indication information of the first cell;

second information, configured for indicating a service type of the first cell;

third information, comprising a cell identifier list of a specific service type cell;

the first information and a first emergency service support indication, wherein the first emergency service support indication is configured for indicating that the first cell supports an emergency service;

the second information and a second emergency service support indication, wherein the second emergency service support indication is configured for indicating that the first cell supports the emergency service; or the third information and a third emergency service support indication, wherein the third emergency service support indication is configured for indicating that some or all of cells corresponding to the cell identifier list support the emergency service;

wherein in a case that the target information is obtained through the first cell, the target information comprises at least one of:

fourth information, comprising barred indication information of the first cell;

the fourth information and a fourth emergency service support indication, wherein the fourth emergency service support indication is configured for indicating that the first cell supports an emergency service; or fifth information and a fifth emergency service support indication, the fifth information is configured for indicating a service type of the first cell, wherein the fifth emergency service support indication is configured for indicating that the first cell supports the emergency service.

7. The terminal according to claim 6, wherein the program or the instructions, when executed by the processor, cause the terminal to perform:

obtaining the target information through broadcast information or downlink dedicated signaling of the neighbor cell of the first cell; or obtaining the target information through broadcast information of the first cell.

8. The terminal according to claim 6, wherein the program or the instructions, when executed by the processor, cause the terminal to perform at least one of:

determining, in a case that the target information comprises the first information and the terminal capability information indicates that the terminal has a first capability, the first cell as the candidate cell;

determining, in a case that the target information comprises the first information and the terminal capability information indicates that the terminal has a second capability, the first cell as the barred cell;

determining, in a case that the target information comprises the second information and a terminal capability indicated by the terminal capability information matches a cell service type indicated by the second information, the first cell as the candidate cell;

determining, in a case that the target information comprises the second information and the terminal capability indicated by the terminal capability information does not match the cell service type indicated by the second information, the first cell as the barred cell;

determining, in a case that the target information comprises the third information, a cell identifier list in the third information includes an identifier of the first cell, and the terminal capability information indicates that the terminal has the first capability, the first cell as the candidate cell;

determining, in a case that the target information comprises the third information, the cell identifier list in the third information includes the identifier of the first cell, and the terminal capability information indicates that the terminal has the second capability, the first cell as the barred cell;

determining, in a case that the target information comprises the first information and the first emergency service support indication, and the terminal capability information indicates that the terminal has the first capability, the first cell as the candidate cell;

determining, in a case that the target information comprises the first information and the first emergency service support indication, and the terminal capability information indicates that the terminal has the second capability, the first cell as a candidate cell which only provides the emergency service;

determining, in a case that the target information comprises the second information and the second emergency service support indication, and the terminal capability indicated by the terminal capability information matches the cell service type indicated by the second information, the first cell as the candidate cell;

determining, in a case that the target information comprises the second information and the second emergency service support indication, and the terminal capability indicated by the terminal capability information does not match the cell service type indicated by the second information, the first cell as the candidate cell which only provides the emergency service;

determining, in a case that the target information comprises the third information and the third emergency service support indication, the cell identifier list in the third information includes the identifier of the first cell, the third emergency service support indication indicates the first cell supports the emergency service, and the terminal capability information indicates that the terminal has the first capability, the first cell as the candidate cell; or determining, in a case that the target information comprises the third information and the third emergency service support indication, the cell identifier list in the third information includes the identifier of the first cell, the third emergency service support indication indicates the first cell supports the emergency service, and the terminal capability information indicates that the terminal has the second capability, the first cell as the candidate cell which only provides the emergency service.

9. The terminal according to claim 6, wherein the program or the instructions, when executed by the processor, cause the terminal to perform at least one of:

determining, in a case that the target information comprises the fourth information and the terminal capability information indicates that the terminal has a first capability, the first cell as the candidate cell;

determining, in a case that the target information comprises the fourth information and the terminal capability information indicates that the terminal has a second capability, the first cell as the barred cell;

determining, in a case that the target information comprises the fourth information and the fourth emergency service support indication, and the terminal capability information indicates that the terminal has the first capability, the first cell as the candidate cell;

determining, in a case that the target information comprises the fourth information and the fourth emergency service support indication, and the terminal capability information indicates that the terminal has the second capability, the first cell as the candidate cell which only provides an emergency service;

determining, in a case that the target information comprises the fifth information and the fifth emergency service support indication, and the terminal capability indicated by the terminal capability information matches the service type of the first cell indicated by the fifth information, the first cell as the candidate cell; or determining, in a case that the target information comprises the fifth information and the fifth emergency service support indication, and the terminal capability indicated by the terminal capability information does not match the service type of the first cell indicated by the fifth information, the first cell as the candidate cell which only provides the emergency service.

10. The terminal according to claim 6, wherein the specific service type cell comprises a non-terrestrial network (NTN) cell; and/or a first capability comprises an NTN access capability, and a second capability comprises other capabilities other than the first capability.

11. A non-transitory readable storage medium, storing a program or instructions, wherein the program or the instructions, when executed by a processor of a terminal, cause the terminal to perform:

obtaining target information of a first cell, wherein the target information is configured for indicating access information of the first cell; and determining, based on the target information and terminal capability information, the first cell as a candidate cell or a barred cell when cell reselection is performed;

wherein the program or the instructions, when executed by the processor, cause the terminal to perform at least one of:

obtaining the target information through a neighbor cell of the first cell; or obtaining the target information through the first cell;

wherein in a case that the target information is obtained through the neighbor cell of the first cell, the target information comprises at least one of:

first information, comprising barred indication information of the first cell;

second information, configured for indicating a service type of the first cell;

third information, comprising a cell identifier list of a specific service type cell;

the first information and a first emergency service support indication, wherein the first emergency service support indication is configured for indicating that the first cell supports an emergency service;

the second information and a second emergency service support indication, wherein the second emergency service support indication is configured for indicating that the first cell supports the emergency service; or the third information and a third emergency service support indication, wherein the third emergency service support indication is configured for indicating that some or all of cells corresponding to the cell identifier list support the emergency service;

wherein in a case that the target information is obtained through the first cell, the target information comprises at least one of:

fourth information, comprising barred indication information of the first cell;

the fourth information and a fourth emergency service support indication, wherein the fourth emergency service support indication is configured for indicating that the first cell supports an emergency service; or fifth information and a fifth emergency service support indication, the fifth information is configured for indicating a service type of the first cell, wherein the fifth emergency service support indication is configured for indicating that the first cell supports the emergency service.

12. The non-transitory readable storage medium according to claim 11, wherein the program or the instructions, when executed by the processor, cause the terminal to perform at least one of:

determining, in a case that the target information comprises the fourth information and the terminal capability information indicates that the terminal has a first capability, the first cell as the candidate cell;

determining, in a case that the target information comprises the fourth information and the terminal capability information indicates that the terminal has a second capability, the first cell as the barred cell;

determining, in a case that the target information comprises the fourth information and the fourth emergency service support indication, and the terminal capability information indicates that the terminal has the first capability, the first cell as the candidate cell;

determining, in a case that the target information comprises the fourth information and the fourth emergency service support indication, and the terminal capability information indicates that the terminal has the second capability, the first cell as the candidate cell which only provides an emergency service;

determining, in a case that the target information comprises the fifth information and the fifth emergency service support indication, and the terminal capability indicated by the terminal capability information matches the service type of the first cell indicated by the fifth information, the first cell as the candidate cell; or determining, in a case that the target information comprises the fifth information and the fifth emergency service support indication, and the terminal capability indicated by the terminal capability information does not match the service type of the first cell indicated by the fifth information, the first cell as the candidate cell which only provides the emergency service.

13. The non-transitory readable storage medium according to claim 11, wherein the program or the instructions, when executed by the processor, cause the terminal to perform:

obtaining the target information through broadcast information or downlink dedicated signaling of the neighbor cell of the first cell; or obtaining the target information through broadcast information of the first cell.

14. The non-transitory readable storage medium according to claim 11, wherein the program or the instructions, when executed by the processor, cause the terminal to perform at least one of:

determining, in a case that the target information comprises the first information and the terminal capability information indicates that the terminal has a first capability, the first cell as the candidate cell;

determining, in a case that the target information comprises the first information and the terminal capability information indicates that the terminal has a second capability, the first cell as the barred cell;

determining, in a case that the target information comprises the second information and a terminal capability indicated by the terminal capability information matches a cell service type indicated by the second information, the first cell as the candidate cell;

determining, in a case that the target information comprises the second information and the terminal capability indicated by the terminal capability information does not match the cell service type indicated by the second information, the first cell as the barred cell;

determining, in a case that the target information comprises the third information, a cell identifier list in the third information includes an identifier of the first cell, and the terminal capability information indicates that the terminal has the first capability, the first cell as the candidate cell;

determining, in a case that the target information comprises the third information, the cell identifier list in the third information includes the identifier of the first cell, and the terminal capability information indicates that the terminal has the second capability, the first cell as the barred cell;

determining, in a case that the target information comprises the first information and the first emergency service support indication, and the terminal capability information indicates that the terminal has the first capability, the first cell as the candidate cell;

determining, in a case that the target information comprises the first information and the first emergency service support indication, and the terminal capability information indicates that the terminal has the second capability, the first cell as a candidate cell which only provides the emergency service;

determining, in a case that the target information comprises the second information and the second emergency service support indication, and the terminal capability indicated by the terminal capability information matches the cell service type indicated by the second information, the first cell as the candidate cell;

determining, in a case that the target information comprises the second information and the second emergency service support indication, and the terminal capability indicated by the terminal capability information does not match the cell service type indicated by the second information, the first cell as the candidate cell which only provides the emergency service;

determining, in a case that the target information comprises the third information and the third emergency service support indication, the cell identifier list in the third information includes the identifier of the first cell, the third emergency service support indication indicates the first cell supports the emergency service, and the terminal capability information indicates that the terminal has the first capability, the first cell as the candidate cell; or determining, in a case that the target information comprises the third information and the third emergency service support indication, the cell identifier list in the third information includes the identifier of the first cell, the third emergency service support indication indicates the first cell supports the emergency service, and the terminal capability information indicates that the terminal has the second capability, the first cell as the candidate cell which only provides the emergency service.

15. The non-transitory readable storage medium according to claim 11, wherein the specific service type cell comprises a non-terrestrial network (NTN) cell; and/or a first capability comprises an NTN access capability, and a second capability comprises other capabilities other than the first capability.

\* \* \* \* \*